United States Patent
Pich

(10) Patent No.: US 9,809,482 B2
(45) Date of Patent: Nov. 7, 2017

(54) METHOD FOR TREATING MINERAL SLUDGE BY FLOCCULATION IN-LINE THEN ABOVE GROUND

(71) Applicant: S.P.C.M. SA, Andrezieux Boutheon (FR)

(72) Inventor: René Pich, Saint Etienne (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 121 days.

(21) Appl. No.: 14/430,960

(22) PCT Filed: Oct. 15, 2013

(86) PCT No.: PCT/FR2013/052461
§ 371 (c)(1),
(2) Date: Mar. 25, 2015

(87) PCT Pub. No.: WO2014/076383
PCT Pub. Date: May 22, 2014

(65) Prior Publication Data
US 2015/0239764 A1    Aug. 27, 2015

(30) Foreign Application Priority Data
Nov. 16, 2012  (FR) ..................... 12 60931

(51) Int. Cl.
*C02F 1/52*    (2006.01)
*B01D 21/01*    (2006.01)
(Continued)

(52) U.S. Cl.
CPC ........... *C02F 11/14* (2013.01); *B01D 21/01* (2013.01); *B65G 5/00* (2013.01); *C02F 1/52* (2013.01);
(Continued)

(58) Field of Classification Search
USPC ... 405/52–57, 59, 60, 79, 80, 108, 116, 117, 405/128.1, 128.15, 128.45, 128.5, 129.1,
(Continued)

(56) References Cited

U.S. PATENT DOCUMENTS 3,312,070 A    4/1967 Matsuo et al.
3,908,387 A    9/1975 Nakamura
(Continued)

FOREIGN PATENT DOCUMENTS

CA    1273888 A1    9/1990
CA    2407869 A1    12/2001
(Continued)

OTHER PUBLICATIONS

International Search Report for PCT/FR2013/052461 dated Feb. 7, 2014.

*Primary Examiner* — Clare M Perrin
(74) *Attorney, Agent, or Firm* — Heslin Rothenberg Farley & Mesiti P.C.

(57) ABSTRACT

The improved process for conditioning sludges by flocculation, according to which:
- the sludge to be treated is transported in a pipeline,
- at least one flocculating agent is inserted in the pipeline that transports the sludge to be treated,
- the sludge is then mixed with the said flocculating agent.
- finally, the mixture is transported and then discharged in a natural or an artificial excavation at a distance from the bottom of the said excavation that is less than its depth.

15 Claims, 1 Drawing Sheet

(51) Int. Cl.
*E21B 21/06* (2006.01)
*B65G 5/00* (2006.01)
*E02B 8/06* (2006.01)
*B09C 1/08* (2006.01)
*C02F 11/14* (2006.01)
*F17D 1/14* (2006.01)
*C02F 1/56* (2006.01)
*C02F 1/00* (2006.01)
*B03D 3/00* (2006.01)
*B01D 21/24* (2006.01)
*C10G 1/04* (2006.01)
*E21B 21/00* (2006.01)
*B09C 1/00* (2006.01)
*B09B 1/00* (2006.01)
*C09K 8/588* (2006.01)
*C09K 8/02* (2006.01)
*E21B 43/34* (2006.01)
*E21B 43/40* (2006.01)
*F17D 1/08* (2006.01)
*F17D 3/16* (2006.01)

(52) U.S. Cl.
CPC .................. *C02F 1/56* (2013.01); *F17D 1/14* (2013.01); *B09B 1/00* (2013.01); *B09C 1/00* (2013.01); *C10G 1/04* (2013.01); *E21B 21/06* (2013.01); *E21B 21/068* (2013.01); *E21B 43/34* (2013.01); *E21B 43/40* (2013.01); *F17D 1/088* (2013.01); *F17D 3/16* (2013.01)

(58) Field of Classification Search
USPC .............................. 405/129.5–129.75, 129.85
See application file for complete search history.

(56) References Cited

U.S. PATENT DOCUMENTS

| 4,347,140 | A | * | 8/1982 | Condolios | C02F 1/52 |
| | | | | | 210/195.1 |
| 4,399,039 | A | * | 8/1983 | Yong | B03B 9/02 |
| | | | | | 208/390 |
| 6,042,732 | A | * | 3/2000 | Jankowski | C02F 11/14 |
| | | | | | 209/5 |
| 2010/0105976 | A1 | | 4/2010 | Poncet et al. | |

FOREIGN PATENT DOCUMENTS

| CA | 2515581 A1 | 7/2004 |
| FR | 2922123 A1 | 4/2009 |
| WO | 9605146 A1 | 2/1996 |

\* cited by examiner

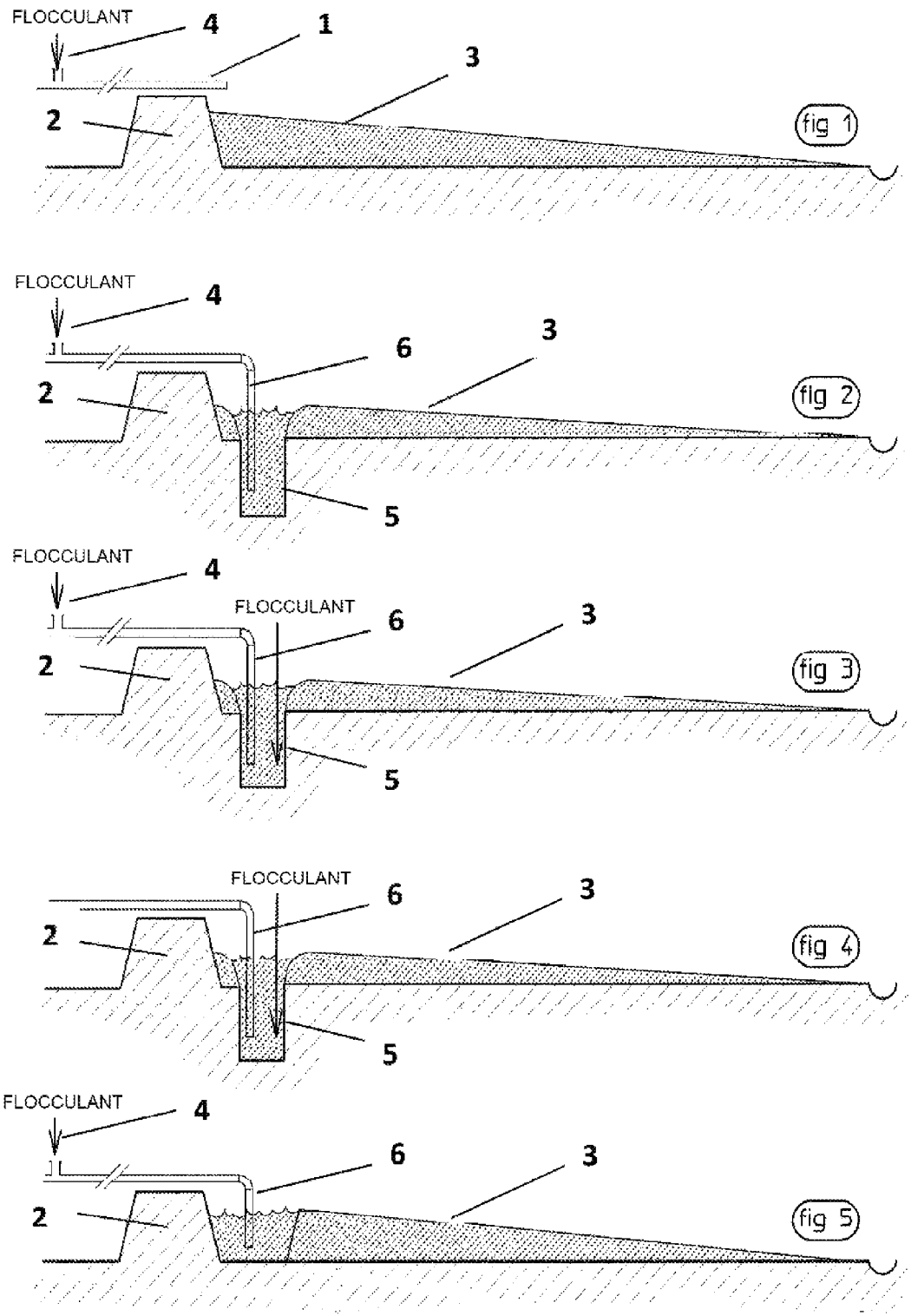

METHOD FOR TREATING MINERAL SLUDGE BY FLOCCULATION IN-LINE THEN ABOVE GROUND

CROSS REFERENCE TO RELATED APPLICATIONS

This application is a national stage filing under section 371 of International Application No. PCT/FR2013/052461, filed on Oct. 15, 2013, and published on May 22, 2014 as WO 2014/076383, which claims priority to French Application No. 1260931, filed on Nov. 16, 2012. The entire contents of each of said applications are hereby incorporated herein by reference.

The invention relates to a method of in-line treatment followed by a treatment above the ground.

The treatment of mineral sludge accumulating above the ground has become a necessity from both the technical and regulatory point of view.

"Sludge" in particular refers to all types of slurries such as municipal sludge, drilling mud, industrial sludge as well as all mining effluents, waste from mining caused by coal mines, metal mines, or heavy oil mines (oil sand). These suspensions usually include clay, sediments, sand, metal oxides etc., mixed with water. The concentration of suspended solids is such that the mixture is viscous.

Traditionally, this sludge was discharged into lagoons or dams in semi-liquid form, and could be several tens of meters thick. The water trapped in the sludge could not evaporate and this sludge remained in a permanent semi-liquid form.

To be made solid, the sludge can be treated in different ways:
  by filtration with the help of plate or strip filters after flocculation,
  by centrifugation after flocculation.

Given the huge volumes involved, a method of flocculation above the ground was followed, in relatively thin and successive layers, allowing both immediate separation of the liquid through flocculation, followed by an evaporation that helps to obtain a solid form that can be easily transported. This method was developed in the 70s. In most cases, these solids are transported to mining excavation sites for back-filling.

This method is more advantageous compared to the first two methods, which do not allow natural drying and give the sludge poor consistency. Their thermal drying is too expensive to be used.

Today, these methods are either applied to sludge derived from thickeners or sludge derived from lagoons or taken through dredges.

This method is now old: the first U.S. Pat. No. 3,312,070 was filed on 9 Mar. 1960. The following patents can be mentioned as other documents: U.S. Pat. No. 4,347,140 of 1981, CA 1,273,888 of 1986, WO 96/05146 of 1994, CA 2,407,869 of 2000 and CA 1,515,581 in 2004.

The document U.S. Pat. No. 3,908,387 describes a process to consolidate the grounds for later constructions. For this, a stabilising agent is mixed with the soil extracted from the ground. The mixture thus formed is reinserted into the soil and then removed once again, only to be mixed once more with the stabilising agent. In this process, the soil permanently contains the stabilising agent. Furthermore, no reference is made to the flocculation process.

The document FR 2 922 123 A1 describes a procedure for treating sludge according to which it is discharged into a mud crater treated with polymer beforehand. The sludge is unloaded from the end of the pipe above the excavation.

All the methods described in these documents use in-line flocculation in the transport pipe, with one or several flocculant insertions, at a given distance from the exit point.

The flocculated sludge is pumped out and unloaded as it is above the ground or in the form of successive layers in all cases, and in such conditions that the end of the pipeline from which the sludge is discharged is located above the highest level of the sludge.

It is important to avoid thickening the sludge by structuring it, which gives a solid or semi-solid form to the sludge; for example, it may become a gelatinous slurry that may not dry out completely or may dehydrate inadequately. The formation of sludge in which a unique network between the particles is formed due to the flocculants does not produce good results in terms of drying. However, the final treatment of the sludge involves drying it thoroughly, which will help to extract it using a bulldozer or to reforest the area.

A flocculation with fine granular flocs that are well separated is required for good drying. The best compromise between dehydration and drying of the sludge is obtained when the treated sludge is in the form of multiple flocs and in large sizes.

The sludges arranged in layers of about 10 to 50 cm dry out within few days or in about ten days, giving them more or less a solid form depending on the type of sludge.

The flocculation criterion is visual. In every case, a certain quantity of flocculant is added so that the water that streams is either crystal clear or as clear as possible when it contains solution materials. The higher the granularity and thinness of the flocculation, and the less gelatinous it is, the more efficiently it dries through evaporation.

The purpose is thus to get flocs of uniform sizes at the end of the flocculation with the highest possible repose angle. This helps to spread the treated sludge on a steeper slope and thus unload the maximum volume of sludge onto the minimum area.

Given the speed of the flocculated suspension at the pipe outlet, the sludge cannot be immediately deposited. On the contrary, the sludge is directed by the liquid flow and only deposits when the weight of the flocs (vertical component of the force applied on the floc) is more than the force of flow (horizontal component of the force applied on the floc).

To be more precise, it is important that the treated sludge does not come out in a solid or semi-solid form at the pipe outlet.

Depending on the sludge structure and the slope during the formation, the distance at which the sludge deposits in relation to the pipe outlet can be significant, and can go up to tens or even hundreds of meters. The final criterion is to obtain clear water after this waste disposal, which signifies that the entire mass has been well flocculated and in turn will lead to quick drying. The limit is thus the length of the treatment case, which defines the height of the waste deposit depending on the angle formed.

The flocculation in the inlet pipe collides with each other because it is not a unitary operation. For proper flocculation:
  It is important to quickly mix the sludge with the flocculant, which can be done in the pipe under turbulent conditions where the Reynolds number is very high
  then the flocculation itself requires low shearing where the Reynolds number is lower (streamline condition) than that given by the speed of the liquid in the pipe.

However, the pumping speed is also significant i.e. about 1 to 3 meters per second in pipelines of diameter between 200 and 600 mm.

Though the mixture is satisfactory, an excess flocculation is required, which could go from 20 to 200% of the quantity measured in the laboratory, in order to obtain complete flocculation. In a turbulent environment, the excess flocculation helps to reflocculate the flocs broken by shearing.

In-line flocculation requires an additional quantity of flocculant to flocculate the microflocs that are formed by shearing, due to the speed of the liquid. It is inconvenient when excess polymer remains in the form of free particles, which leads to viscous flocculation in water that reduces the speed of drying.

Therefore, there is a need to improve the processes for treating sludge by flocculation.

Since it is impossible to obtain in-line flocculation with very low flocculant consumption, it appeared that it was necessary to separate the mixing process from the flocculation process in the most efficient manner possible.

The purpose of this invention is to therefore improve the process for treating sludge by flocculation, according to which:
- the sludge to be treated is transported in a pipeline,
- at least one flocculating agent is inserted in the pipeline that transports the aforesaid sludge,
- the sludge is then mixed with the said flocculating agent,
- finally, we transport and then discharge the mixture in a natural or an artificial excavation at a distance from the bottom of the said excavation lesser than that of its depth.

The process, according to the invention, thus helps to separate the stages of mixture and flocculation in the in-line treatment process. The mixing stage is optimum and flocculation stage is limited during transport. The mixture of the flocculating agent with the sludge is formed naturally due to the turbulences in the pipeline.

The flocculation is carried out in the excavation when it is full owing to natural or swirling movements associated with insertion of the sludge. The shearings are low and favourable for good flocculation. This is made possible by inserting the mixture at a level lower than the high level of the excavation. A boiling crater is formed in which the flocculation is highly efficient.

As mentioned before, the excavation can be done naturally or artificially. When a new installation is set up, the excavation is formed directly in ground on which no sludge has been spread.

While modifying an existing installation, the excavation is carried out wholly or partially on the thickness of the sludge layer when it is already present, providing a lot of advantages, on the natural ground.

According to the first feature, the point of insertion of polymer in the pipeline transporting the sludge to be treated is preferably near the outlet of the pipe transporting the sludge to the unloading area. The insertion point must be chosen in such a way that the mixture is prepared in line and the flocculation is done in part after exiting the pipe. The distance between the insertion point and the pipeline outlet is generally obtained by successive tests; generally, it is about 10 to 200 times bigger than the internal diameter of the pipeline.

In other words, according to the invention, the flocculating agent is inserted close to the free end of the pipeline, preferably at a distance from the free end of the pipeline which is about 10 to 200 times the internal diameter of the pipeline.

According to another feature, the immersed pipe is vertically positioned.

To be more precise, the pipeline in which it is transported and from which the mixture is discharged is positioned vertically, at least in the terminal part. Under these conditions, as and when the excavation fills up, the vertical pipeline is gradually immersed.

In the case of artificial excavation, the flocculation crater is formed with the help of a power shovel at the pipe outlet for unloading.

In some cases, the crater is formed naturally outside the presence of any excavations and gradually unloads the mixture on the ground, which may or may not be covered with sludge, which was previously dried.

In practice, all the procedural configurations help to significantly reduce the flocculant consumption.

Besides, it appears that the process in which the flocculant is partly added in the pipeline during transport, and at the same time directly into the flocculating crater, is the one in which the consumption is the lowest. Good results are particularly obtained when a majority of the flocculant is added into the pipeline during transport and some is added into the flocculating crater.

Generally speaking, the insertion of the sludge-flocculant mixture, formed in the pipe, near the outlet, at an altitude less than that of the sludge once spread—which means under the sludge layer, depending on the speed of the liquid at the time of its unloading_enables the formation of a crater where the speed reduces drastically, allowing an optimised flocculation under light turbulent condition, preferably streamline (low Reynolds number).

At the time of insertion, the boiling liquid on the surface lets the well-formed flocs escape onto the rim of the crater and quickly deposit it with quantities of flocculants smaller than the on-line flocculation.

The start-up of the process can either be done by digging a hole in the inlet pipe with the help of a power shovel or waiting until the layer is thick enough to form a crater.

Clearly, the insertion point of the polymer is critical, and the inlet pipe has several insertion points. The appropriate insertion point will be selected after successive tests.

It is possible to insert one or many flocculants during transport.

All the natural chemicals of flocculants can be used, i.e. natural flocculants like polysaccharides or synthetic flocculants.

Acrylamide-based flocculants are generally preferred. Amongst the polymers, the copolymers prepared from the following monomers are particularly interesting: Acrylic acid, ATBS (2-acrylamido 2-methylpropanesulfonic acid), diallyldimethylammonium chloride (DADMAC), dimethylaminoethyl acrylate (DMAEA) and dialkylaminoethyl methacrylate (MADAME) as well as their acidified or quarternized salts and N-Vinylpyrrolidone. The ethylene polyoxides and polyethylene amine can also be used in these polymers.

The invention and the advantages resulting from it will be better understood with the examples of realisation given below and with the help of the figures annexed.

FIG. 1 is a schematic representation of a process according to the prior art.

FIGS. 2, 3 and 5 are schematic representations of procedural variants according to invention.

FIG. 4 is a schematic representation of an off-line flocculating process.

EXAMPLES

Comparative Example 1 (FIG. 1)

The aim is to process the lagoon sludge (MFT or Mature Fine Tailings) coming from the asphalt extraction process of asphalt sands. To do this, the sludge is pumped out using the suction dredger, which is transported up to the unloading area. The sludge contains 33 to 35% of suspended solids. The unloading pipe (1) is positioned at ground level, (2) the level above (3) which the sludge is expected to reach after it is treated.

Polymer from example 3, described in the document US 2010/0105976, is used with a concentration of 3 gr/liter. The laboratory tests show that 420 grams of flocculant per ton is required for dry material in order to get good flocculation without thickening in the form of a viscous mass (solid or semi-solid).

Industrially, in a pipe (1) with diameter of size 300 mm, when the sludge circulates at a speed of 1.4 m/sec, the flocculant (4) is inserted at 30 meters from the exit point and the volume is visually adjusted such that crystal clear water is obtained at the pipe outlet along with large well formed flocs.

The optimum quantity of flocculant (or consumption) is 830 grams per ton.

Over-flocculation is observed when a higher quantity of flocculating agent is added, which makes the sludge solid, like a gel, and reduces the quantity of water extracted from the sludge.

Comparative Example 2

In this case, the quantity of flocculant is divided into 2 equal parts and inserted at 60 meters and 20 meters from the exit point. Keeping the same criteria in mind, the optimum quantity of flocculant is 760 grams per ton.

Example 3 (FIG. 2)

In this case, a 1×1 sq. meter and depth 1.5 meter hole (5) is dug with the help of a power shovel. The mixed sludge is inserted close to the toe of the hole with the help of a pipeline (6) positioned vertically, where the distance from the bottom is lesser than that of its depth. The flocculant is inserted 10 meters from the exit point.

The sludge gradually forms a crater in the excavation, where it flocculates at low speed via boiling and spreads at the outlet of the crater with crystal clear water and at an optimum quantity of flocculant, 540 grams per ton.

Example 4 (FIG. 3)

Example 3 is reproduced, except that 50% of the flocculant is allocated at 10 meters from the exit point and 50% at the bottom of the crater through a pipe fixed to the main pipe. The optimum quantity of flocculant is reduced to 490 grams per ton.

When 70% of the flocculant is inserted at 10 meters from the exit point and 30% at the bottom of the crater, the optimum quantity of flocculant is reduced to 460 grams per ton.

Example 5 (FIG. 4)

The flocculant is sent entirely by an independent pipeline to the bottom of the crater. The consumption observed is 650 grams/ton. It appears that a part of the flocculant has been mixed well and includes an excess of it, although the flocs have been formed well in this mixture. However, this process is less effective compared to the on-line mixture followed by flocculation in the crater. Moreover, a tendency to quickly clog the hole is observed by depositing the solid.

Example 6 (FIG. 5)

In this case, the mixed sludge is directly inserted on the ground and a crater with more or less depth is quickly formed according to the type of the sludge and the depth of the crater; the visual monitoring of the consumption reduces over time and with the depth of the crater. The consumption starting from 810 grams/ton reduces when the crater is about 1 meter in height and 550 grams per ton, and reduces further when the successive layers are introduced.

It is also noticed that, even if the layers introduced are dry, the recovery of materials can break the dry layer and very soon form a new crater, giving similar results. Increasing the height of the crater to about 3 to 4 meters does not change the flocculation effect.

The quantity and the nature of the flocculant must be adapted according to the type of sludge used. The quantity used must not result in thickening or solidification of the sludge in the crater.

The expert may technically modify the following parameters:
Speed of the liquid,
Insertion points,
Polymer concentration,
Depth of the crater,
Height of the layer that allows good drying, etc.
to optimise the process.

The invention claimed is:

1. A process for conditioning sludge by flocculation, said process comprising:
    transporting the sludge to be treated in a pipeline with an outlet,
    inserting at least one flocculating agent in the pipeline that transports the sludge to be treated,
    mixing the sludge with the said flocculating agent, thereby forming a sludge-flocculant mixture in the pipeline, and
    transporting and then discharging the sludge-flocculant mixture in a natural or an artificial excavation at a distance from the bottom of the natural or artificial excavation lesser than that of its depth, wherein said discharging the sludge-flocculant mixture comprises discharging the sludge-flocculant mixture at a first altitude, and wherein the first altitude is less than the altitude of a level of sludge-flocculant mixture obtained after said discharging, such that as the natural or artificial excavation fills up, the pipeline is gradually immersed, thus forming a boiling crater, where boils at the surface of the boiling crater allow flocs to escape onto a rim of the boiling crater, thereby providing for improved flocculation efficiency.

2. The process according to claim 1 wherein the natural or artificial excavation is located in ground on which no sludge has been spread.

3. The process according to claim 1, wherein the natural or artificial excavation is located entirely or partially on a sludge layer.

4. The process according to claim 1, wherein at least a portion of the pipeline in which the sludge is transported and from which the sludge-flocculant mixture is discharged is positioned vertically, wherein the vertical portion of the pipeline comprises the outlet.

5. The process according to claim 1, wherein the flocculating agent is inserted close to the outlet of the pipeline which is about 10 to 200 times the internal diameter of the pipeline.

6. The process according to claim 1, comprising, in addition to said inserting at least one flocculating agent in the pipeline, inserting at least one flocculating agent directly into the excavation.

7. The process according to claim 6, wherein the majority of flocculating agent used during the process is inserted into the pipeline.

8. The process according to claim 1, wherein the flocculating agent is chosen from the group consisting of acrylic acid, ATBS (2-acrylamido 2-methylpropanesulfonic acid), diallyldimethylammonium chloride (DADMAC), dimethylaminoethyl acrylate (DMAEA) and dialkylaminoethyl methacrylate (MADAME) as well as their acidified or quarternized salts, N-vinylpyrrolidone, ethylene polyoxides and polyethylene amine.

9. The process according to claim 7, wherein the flocculating agent inserted into the pipeline is inserted at a distance from the outlet of the pipeline which is about 10 to 200 times the internal diameter of the pipeline.

10. The process according to claim 2, wherein at least a portion of the pipeline in which the sludge is transported and from which the sludge-flocculant mixture is unloaded is positioned vertically, wherein the vertical portion of the pipeline comprises the outlet.

11. The process according to claim 10, wherein the flocculating agent is chosen from the group consisting of acrylic acid, ATBS (2-acrylamido 2-methylpropanesulfonic acid), diallyldimethylammonium chloride (DADMAC), dimethylaminoethyl acrylate (DMAEA) and dialkylaminoethyl methacrylate (MADAME) as well as their acidified or quarternized salts, N-vinylpyrrolidone, ethylene polyoxides and polyethylene amine.

12. The process according to claim 10, wherein the flocculating agent is inserted close to the outlet of the pipeline, at a distance from the outlet of the pipeline which is about 10 to 200 times the internal diameter of the pipeline.

13. The process according to claim 3, wherein at least a portion of the pipeline in which the sludge is transported and from which the sludge-flocculant mixture is discharged is positioned vertically, wherein the vertical portion of the pipeline comprises the outlet.

14. The process according to claim 13, wherein the flocculating agent is chosen from the group consisting of acrylic acid, ATBS (2-acrylamido 2-methylpropanesulfonic acid), diallyldimethylammonium chloride (DADMAC), dimethylaminoethyl acrylate (DMAEA) and dialkylaminoethyl methacrylate (MADAME) as well as their acidified or quarternized salts, N-vinylpyrrolidone, ethylene polyoxides and polyethylene amine.

15. The process according to claim 13, wherein the flocculating agent is inserted close to outlet of the pipeline, at a distance from outlet of the pipeline which is about 10 to 200 times the internal diameter of the pipeline.

* * * * *